(12) United States Patent
Banks et al.

(10) Patent No.: US 7,657,846 B2
(45) Date of Patent: Feb. 2, 2010

(54) SYSTEM AND METHOD FOR DISPLAYING STACK ICONS

(75) Inventors: Richard M. Banks, Egham (SY);
Charles Cummins, Seattle, WA (US);
David G. De Vorchik, Seattle, WA (US);
Paul A. Gusmorino, Seattle, WA (US);
Relja B. Ivanovic, Redmond, WA (US);
Jenny T. Lam, Seattle, WA (US); Jason F. Moore, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 617 days.

(21) Appl. No.: 10/830,224

(22) Filed: Apr. 23, 2004

(65) Prior Publication Data

US 2005/0240880 A1 Oct. 27, 2005

(51) Int. Cl.
*G06F 3/033* (2006.01)
(52) U.S. Cl. .................. 715/836; 715/822; 715/764; 715/864; 715/827; 715/821; 715/823
(58) Field of Classification Search ............... 715/836, 715/822, 764, 864, 827, 821, 823
See application file for complete search history.

(56) References Cited

U.S. PATENT DOCUMENTS

| | | | |
|---|---|---|---|
| 4,881,179 | A | 11/1989 | Vincent |
| 5,060,135 | A | 10/1991 | Levine et al. |
| 5,241,671 | A | 8/1993 | Reed et al. |
| 5,297,250 | A | 3/1994 | Leroy et al. |
| 5,327,529 | A | 7/1994 | Fults |
| 5,333,266 | A | 7/1994 | Boaz et al. |

(Continued)

FOREIGN PATENT DOCUMENTS

CN 1421800 11/2001

(Continued)

OTHER PUBLICATIONS

Written Opinion of Singapore Application No. 200403220-7 dated May 18, 2006.

(Continued)

*Primary Examiner*—Simon Ke
(74) *Attorney, Agent, or Firm*—Shook Hardy & Bacon LLP

(57) ABSTRACT

The present invention is directed to a method and system for use in a computing environment for representing files stored in stacks. The method includes providing a set of stack icons, each icon in the set having a stack height representing a range of stack sizes. The method additionally includes determining a stack size for a selected stack and selecting and displaying an appropriate stack icon from the set of stack icons based on the determined stack size. The selected stack may be stored within one of multiple libraries. Accordingly a distinct set of icons relevant to each library may be stored for each library. The icons may visibly convey information pertaining to the relevant library. Accordingly, the method may include representing a selected stack by determining an appropriate library and an appropriate stack height and displaying a corresponding icon. The system may additionally include an empty stack icon, a generic stack icon, property based icons, and custom thumbnail icons.

22 Claims, 8 Drawing Sheets

U.S. PATENT DOCUMENTS

| | | | |
|---|---|---|---|
| 5,333,315 A | 7/1994 | Saether et al. | |
| 5,388,196 A | 2/1995 | Pajak et al. | |
| 5,420,605 A | 5/1995 | Vouri | |
| 5,461,710 A | 10/1995 | Bloomfield et al. | |
| 5,499,364 A | 3/1996 | Klein et al. | |
| 5,504,852 A | 4/1996 | Thompson-Rohrlich | |
| 5,513,306 A | 4/1996 | Mills et al. | |
| 5,544,360 A | 8/1996 | Lewak et al. | |
| 5,546,527 A | 8/1996 | Fitzpatrick | |
| 5,550,852 A | 8/1996 | Patel et al. | |
| 5,559,948 A | 9/1996 | Bloomfield et al. | |
| 5,572,647 A | 11/1996 | Blades | |
| 5,583,982 A | 12/1996 | Matheny et al. | |
| 5,590,259 A | 12/1996 | Anderson et al. | |
| 5,596,702 A | 1/1997 | Stucka | |
| 5,598,524 A | 1/1997 | Johnston, Jr. et al. | |
| 5,600,778 A | 2/1997 | Swanson et al. | |
| 5,606,669 A | 2/1997 | Bertin et al. | |
| 5,625,783 A | 4/1997 | Ezekiel | |
| 5,630,042 A | 5/1997 | McIntosh et al. | |
| 5,648,795 A | 7/1997 | Vouri | |
| 5,652,876 A | 7/1997 | Ashe | |
| 5,675,520 A | 10/1997 | Pitt | |
| 5,680,563 A * | 10/1997 | Edelman | 715/835 |
| 5,684,969 A | 11/1997 | Ishida | |
| 5,696,486 A | 12/1997 | Poliquin et al. | |
| 5,696,914 A | 12/1997 | Nahaboo | |
| 5,710,926 A | 1/1998 | Maurer | |
| 5,757,925 A | 5/1998 | Faybishenko | |
| 5,760,770 A | 6/1998 | Bliss | |
| 5,790,121 A | 8/1998 | Sklar et al. | |
| 5,797,139 A | 8/1998 | Amro | |
| 5,802,516 A | 9/1998 | Shwarts et al. | |
| 5,831,606 A | 11/1998 | Nakajima et al. | |
| 5,835,094 A * | 11/1998 | Ermel et al. | 715/848 |
| 5,838,317 A | 11/1998 | Bolnick et al. | |
| 5,838,322 A | 11/1998 | Nakajima et al. | |
| 5,855,446 A | 1/1999 | Disborg | |
| 5,867,163 A | 2/1999 | Kurtenbach | |
| 5,870,088 A | 2/1999 | Washington | |
| 5,875,446 A | 2/1999 | Brown et al. | |
| 5,875,448 A | 2/1999 | Boys | |
| 5,878,410 A | 3/1999 | Zbikowski et al. | |
| 5,886,694 A | 3/1999 | Breinberg et al. | |
| 5,899,995 A | 5/1999 | Millier et al. | |
| 5,905,973 A | 5/1999 | Yonezawa et al. | |
| 5,907,703 A | 5/1999 | Kronenberg | |
| 5,907,837 A | 5/1999 | Ferrel | |
| 5,909,540 A | 6/1999 | Carter et al. | |
| 5,923,328 A | 7/1999 | Griesmer | |
| 5,929,854 A | 7/1999 | Ross | |
| 5,930,801 A | 7/1999 | Falkenhainer | |
| 5,933,139 A | 8/1999 | Feigner et al. | |
| 5,935,210 A | 8/1999 | Stark | |
| 5,973,686 A | 10/1999 | Shimogori | |
| 5,987,454 A | 11/1999 | Hobbs | |
| 5,987,506 A | 11/1999 | Carter et al. | |
| 6,003,040 A | 12/1999 | Mital et al. | |
| 6,008,806 A | 12/1999 | Nakajima et al. | |
| 6,014,137 A | 1/2000 | Burns | |
| 6,016,692 A | 1/2000 | Schaenzer et al. | |
| 6,021,262 A | 2/2000 | Cote et al. | |
| 6,023,708 A | 2/2000 | Mendez et al. | |
| 6,024,843 A | 2/2000 | Anderson | |
| 6,025,843 A | 2/2000 | Sklar | |
| 6,037,944 A | 3/2000 | Hugh | |
| 6,055,540 A | 4/2000 | Snow | |
| 6,055,543 A | 4/2000 | Christensen et al. | |
| 6,061,059 A | 5/2000 | Taylor | |
| 6,061,692 A | 5/2000 | Thomas et al. | |
| 6,061,695 A | 5/2000 | Slivka et al. | |
| 6,065,012 A | 5/2000 | Balsara et al. | |
| 6,078,924 A | 6/2000 | Ainsbury et al. | |
| 6,097,389 A | 8/2000 | Morris et al. | |
| 6,101,509 A | 8/2000 | Hanson | |
| 6,144,968 A | 11/2000 | Zellweger | |
| 6,147,601 A | 11/2000 | Sandelman et al. | |
| 6,160,552 A | 12/2000 | Wilsher | |
| 6,175,364 B1 | 1/2001 | Wong et al. | |
| 6,181,342 B1 | 1/2001 | Niblack | |
| 6,202,061 B1 | 3/2001 | Khosla et al. | |
| 6,216,122 B1 | 4/2001 | Elson | |
| 6,237,004 B1 | 5/2001 | Dodson et al. | |
| 6,237,011 B1 | 5/2001 | Ferguson et al. | |
| 6,240,407 B1 | 5/2001 | Chang et al. | |
| 6,240,421 B1 | 5/2001 | Stolarz | |
| 6,243,094 B1 | 6/2001 | Sklar | |
| 6,243,724 B1 * | 6/2001 | Mander et al. | 715/526 |
| 6,246,411 B1 | 6/2001 | Strauss | |
| 6,256,031 B1 | 7/2001 | Meijer et al. | |
| 6,268,852 B1 | 7/2001 | Lindhorst et al. | |
| 6,275,829 B1 | 8/2001 | Angiulo et al. | |
| 6,279,016 B1 | 8/2001 | De Vorchick et al. | |
| 6,301,586 B1 | 10/2001 | Yang et al. | |
| 6,308,173 B1 | 10/2001 | Glasser et al. | |
| 6,317,142 B1 | 11/2001 | Decoste et al. | |
| 6,324,541 B1 | 11/2001 | De I'etraz et al. | |
| 6,324,551 B1 | 11/2001 | Lamping et al. | |
| 6,326,953 B1 | 12/2001 | Wana | |
| 6,330,007 B1 | 12/2001 | Isreal | |
| 6,339,767 B1 | 1/2002 | Rivette et al. | |
| 6,341,280 B1 | 1/2002 | Glass et al. | |
| 6,342,907 B1 | 1/2002 | Petty | |
| 6,356,863 B1 | 3/2002 | Sayle | |
| 6,356,915 B1 | 3/2002 | Chtchetkine et al. | |
| 6,363,377 B1 | 3/2002 | Kravets et al. | |
| 6,363,400 B1 | 3/2002 | Chtchetkine et al. | |
| 6,369,840 B1 | 4/2002 | Barnett et al. | |
| 6,377,283 B1 | 4/2002 | Thomas | |
| 6,401,097 B1 | 6/2002 | McCotter et al. | |
| 6,405,265 B1 | 6/2002 | Kronenberg | |
| 6,408,298 B1 | 6/2002 | Van | |
| 6,411,311 B1 | 6/2002 | Rich et al. | |
| 6,425,120 B1 | 7/2002 | Morganelli et al. | |
| 6,425,121 B1 | 7/2002 | Phillips | |
| 6,430,575 B1 | 8/2002 | Dourish et al. | |
| 6,430,835 B1 | 8/2002 | Ranucci et al. | |
| 6,437,807 B1 | 8/2002 | Berquist et al. | |
| 6,438,590 B1 | 8/2002 | Gartner | |
| 6,448,985 B1 | 9/2002 | McNally | |
| 6,453,311 B1 | 9/2002 | Powers, III | |
| 6,453,319 B1 | 9/2002 | Mattis et al. | |
| 6,462,762 B1 | 10/2002 | Ku | |
| 6,466,228 B1 * | 10/2002 | Ulrich et al. | 345/619 |
| 6,466,238 B1 | 10/2002 | Berry et al. | |
| 6,466,932 B1 | 10/2002 | Dennis et al. | |
| 6,470,344 B1 | 10/2002 | Kothuri et al. | |
| 6,473,100 B1 | 10/2002 | Beaumont et al. | |
| 6,480,835 B1 | 11/2002 | Light | |
| 6,483,525 B1 | 11/2002 | Tange | |
| 6,505,233 B1 | 1/2003 | Hanson et al. | |
| 6,513,038 B1 | 1/2003 | Hasegawa et al. | |
| 6,519,612 B1 | 2/2003 | Howard et al. | |
| 6,526,399 B1 | 2/2003 | Coulson et al. | |
| 6,535,229 B1 | 3/2003 | Kraft | |
| 6,535,230 B1 | 3/2003 | Celik | |
| 6,539,399 B1 | 3/2003 | Hazama et al. | |
| 6,544,295 B1 | 4/2003 | Bodnar | |
| 6,549,217 B1 | 4/2003 | De Greef et al. | |
| 6,549,916 B1 | 4/2003 | Sedlar | |
| 6,563,514 B1 | 5/2003 | Samar | |
| 6,571,245 B2 | 5/2003 | Huang et al. | |
| 6,573,906 B1 | 6/2003 | Harding et al. | |
| 6,573,907 B1 | 6/2003 | Madrane | |

| | | |
|---|---|---|
| 6,583,799 B1 | 6/2003 | Manolis et al. |
| 6,590,585 B1 | 7/2003 | Suzuki et al. |
| 6,606,105 B1 | 8/2003 | Quartetti |
| 6,613,101 B2 | 9/2003 | Mander et al. |
| 6,628,309 B1 | 9/2003 | Dodson et al. |
| 6,636,238 B1 | 10/2003 | Amir et al. |
| 6,636,250 B1 | 10/2003 | Gasser |
| 6,638,313 B1 | 10/2003 | Freeman |
| 6,658,406 B1 | 12/2003 | Mazner et al. |
| 6,662,198 B2 | 12/2003 | Satyanarayanan et al. |
| 6,684,222 B1 | 1/2004 | Cornelius et al. |
| 6,721,760 B1 | 4/2004 | Ono |
| 6,735,623 B1 | 5/2004 | Prust |
| 6,738,770 B2 | 5/2004 | Gorman |
| 6,745,206 B2 | 6/2004 | Mandler et al. |
| 6,745,207 B2 | 6/2004 | Reuter et al. |
| 6,751,626 B2 | 6/2004 | Brown et al. |
| 6,754,829 B1 | 6/2004 | Butt et al. |
| 6,760,721 B1 | 7/2004 | Chasen |
| 6,762,776 B2 | 7/2004 | Huapaya |
| 6,762,777 B2 | 7/2004 | Carroll |
| 6,763,458 B1 | 7/2004 | Watanabe et al. |
| 6,763,777 B1 | 7/2004 | Rosenberg |
| 6,768,999 B2 | 7/2004 | Prager et al. |
| 6,784,900 B1 | 8/2004 | Dobronsky et al. |
| 6,784,925 B1 | 8/2004 | Tomat et al. |
| 6,795,094 B1 | 9/2004 | Watanabe et al. |
| 6,801,909 B2 | 10/2004 | Delgado et al. |
| 6,801,919 B2 | 10/2004 | Hunt et al. |
| 6,803,926 B1 | 10/2004 | Lamb et al. |
| 6,813,474 B2 | 11/2004 | Robinson et al. |
| 6,816,863 B2 | 11/2004 | Bates et al. |
| 6,820,083 B1 | 11/2004 | Nagy et al. |
| 6,823,344 B1 | 11/2004 | Isensee et al. |
| 6,826,443 B2 | 11/2004 | Makinen |
| 6,847,959 B1 | 1/2005 | Arrouye et al. |
| 6,853,391 B2 | 2/2005 | Bates et al. |
| 6,865,568 B2 | 3/2005 | Chau |
| 6,871,348 B1 | 3/2005 | Cooper |
| 6,876,900 B2 | 4/2005 | Czajkowski et al. |
| 6,876,996 B2 | 4/2005 | Czajkowski et al. |
| 6,880,132 B2 | 4/2005 | Uemura |
| 6,883,009 B2 | 4/2005 | Yoo |
| 6,883,146 B2 | 4/2005 | Prabhu et al. |
| 6,906,722 B2 | 6/2005 | Hrebejk et al. |
| 6,910,049 B2 | 6/2005 | Fenton et al. |
| 6,922,709 B2 | 7/2005 | Goodman |
| 6,925,608 B1 | 8/2005 | Neale et al. |
| 6,938,207 B1 | 8/2005 | Haynes |
| 6,944,647 B2 | 9/2005 | Shah et al. |
| 6,947,959 B1 | 9/2005 | Gill |
| 6,948,120 B1 | 9/2005 | Delgobbo |
| 6,950,818 B2 | 9/2005 | Dennis et al. |
| 6,950,989 B2 * | 9/2005 | Rosenzweig et al. ........ 715/721 |
| 6,952,714 B2 | 10/2005 | Peart |
| 6,952,724 B2 | 10/2005 | Prust |
| 6,980,993 B2 | 12/2005 | Horvitz et al. |
| 6,983,424 B1 | 1/2006 | Dutta |
| 7,010,755 B2 | 3/2006 | Anderson et al. |
| 7,024,427 B2 | 4/2006 | Bobbitt et al. |
| 7,028,262 B2 | 4/2006 | Estrada et al. |
| 7,043,472 B2 | 5/2006 | Aridor et al. |
| 7,047,498 B2 | 5/2006 | Lui |
| 7,051,291 B2 | 5/2006 | Sciammarella et al. |
| 7,062,500 B1 | 6/2006 | Hall et al. |
| 7,062,718 B2 | 6/2006 | Kodosky et al. |
| 7,068,291 B1 | 6/2006 | Roberts et al. |
| 7,100,150 B2 | 8/2006 | Polk |
| 7,106,843 B1 | 9/2006 | Gainsboro |
| 7,139,811 B2 | 11/2006 | Lev Ran et al. |
| 7,149,729 B2 | 12/2006 | Kaasten et al. |
| 7,168,051 B2 | 1/2007 | Robinson et al. |
| 7,194,743 B2 | 3/2007 | Hayton |
| 7,203,948 B2 | 4/2007 | Mukundan et al. |
| 7,216,289 B2 | 5/2007 | Kagle |
| 7,216,301 B2 | 5/2007 | Moehrle |
| 7,219,302 B1 | 5/2007 | O'Shaughnessy et al. |
| 7,240,292 B2 | 7/2007 | Hally et al. |
| 7,243,334 B1 | 7/2007 | Berger et al. |
| 7,275,063 B2 | 9/2007 | Horn |
| 7,290,245 B2 | 10/2007 | Skjolsvold |
| 7,293,031 B1 | 11/2007 | Dusker et al. |
| 7,383,494 B2 | 6/2008 | Krolczyk et al. |
| 7,409,382 B2 | 8/2008 | Kido |
| 7,415,484 B1 | 8/2008 | Tulkoff et al. |
| 7,496,859 B2 | 2/2009 | Watanabe |
| 2001/0034733 A1 | 10/2001 | Prompt et al. |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0010736 A1 | 1/2002 | Marques et al. |
| 2002/0019935 A1 | 2/2002 | Andrew et al. |
| 2002/0033844 A1 | 3/2002 | Levy et al. |
| 2002/0046232 A1 | 4/2002 | Adams et al. |
| 2002/0046299 A1 | 4/2002 | Lefeber et al. |
| 2002/0049717 A1 | 4/2002 | Routtenberg et al. |
| 2002/0052885 A1 | 5/2002 | Levy |
| 2002/0054167 A1 | 5/2002 | Hugh |
| 2002/0059199 A1 | 5/2002 | Harvey |
| 2002/0062310 A1 | 5/2002 | Marmor et al. |
| 2002/0063734 A1 | 5/2002 | Khalfay et al. |
| 2002/0070965 A1 | 6/2002 | Austin |
| 2002/0075310 A1 | 6/2002 | Prabhu et al. |
| 2002/0075312 A1 | 6/2002 | Amadio et al. |
| 2002/0075330 A1 | 6/2002 | Rosenzweig et al. |
| 2002/0087652 A1 | 7/2002 | Davis et al. |
| 2002/0087740 A1 | 7/2002 | Castanho et al. |
| 2002/0087969 A1 | 7/2002 | Brunheroto et al. |
| 2002/0089540 A1 | 7/2002 | Geier et al. |
| 2002/0091679 A1 | 7/2002 | Wright |
| 2002/0091697 A1 | 7/2002 | Huang et al. |
| 2002/0091739 A1 | 7/2002 | Ferlitsch et al. |
| 2002/0095416 A1 | 7/2002 | Schwols |
| 2002/0097278 A1 | 7/2002 | Mandler et al. |
| 2002/0100039 A1 | 7/2002 | Iatropoulos et al. |
| 2002/0103998 A1 | 8/2002 | DeBruine |
| 2002/0104069 A1 | 8/2002 | Gouge et al. |
| 2002/0107973 A1 | 8/2002 | Lennon et al. |
| 2002/0111942 A1 | 8/2002 | Campbell et al. |
| 2002/0113821 A1 | 8/2002 | Hrebejk et al. |
| 2002/0120505 A1 | 8/2002 | Henkin et al. |
| 2002/0120604 A1 | 8/2002 | Labarge et al. |
| 2002/0120757 A1 | 8/2002 | Sutherland et al. |
| 2002/0129033 A1 | 9/2002 | Hoxie et al. |
| 2002/0138552 A1 | 9/2002 | DeBruine et al. |
| 2002/0138582 A1 | 9/2002 | Chandra et al. |
| 2002/0138744 A1 | 9/2002 | Schleicher et al. |
| 2002/0144155 A1 | 10/2002 | Bate et al. |
| 2002/0145756 A1 | 10/2002 | Stanley et al. |
| 2002/0149888 A1 | 10/2002 | Motonishi et al. |
| 2002/0152262 A1 | 10/2002 | Arkin et al. |
| 2002/0152267 A1 | 10/2002 | Lennon |
| 2002/0156895 A1 | 10/2002 | Brown |
| 2002/0161800 A1 | 10/2002 | Eld et al. |
| 2002/0163572 A1 | 11/2002 | Center et al. |
| 2002/0169678 A1 | 11/2002 | Chao et al. |
| 2002/0174329 A1 | 11/2002 | Bowler et al. |
| 2002/0181398 A1 | 12/2002 | Szlam |
| 2002/0184357 A1 | 12/2002 | Traversat et al. |
| 2002/0188605 A1 | 12/2002 | Adya et al. |
| 2002/0188621 A1 | 12/2002 | Flank et al. |
| 2002/0188735 A1 | 12/2002 | Needham et al. |
| 2002/0194252 A1 | 12/2002 | Powers, III |

| | | |
|---|---|---|
| 2002/0196276 A1 | 12/2002 | Corl et al. |
| 2002/0199061 A1 | 12/2002 | Friedman et al. |
| 2003/0001964 A1 | 1/2003 | Masukura et al. |
| 2003/0009484 A1 | 1/2003 | Hamanaka et al. |
| 2003/0014415 A1 | 1/2003 | Weiss et al. |
| 2003/0018657 A1 | 1/2003 | Monday |
| 2003/0018712 A1 | 1/2003 | Harrow et al. |
| 2003/0028610 A1 | 2/2003 | Pearson |
| 2003/0033367 A1 | 2/2003 | Itoh |
| 2003/0037060 A1 | 2/2003 | Kuehnel |
| 2003/0041178 A1 | 2/2003 | Brouk et al. |
| 2003/0046260 A1 | 3/2003 | Satyanarayanan et al. |
| 2003/0063124 A1 | 4/2003 | Melhem et al. |
| 2003/0069893 A1 | 4/2003 | Kanai et al. |
| 2003/0069908 A1 | 4/2003 | Anthony et al. |
| 2003/0074356 A1 | 4/2003 | Kaier et al. |
| 2003/0076322 A1 | 4/2003 | Ouzts et al. |
| 2003/0078918 A1 | 4/2003 | Souvignier et al. |
| 2003/0079038 A1 | 4/2003 | Robbin et al. |
| 2003/0091007 A1 | 4/2003 | Cyr et al. |
| 2003/0081002 A1 | 5/2003 | De Vorchik et al. |
| 2003/0084425 A1 | 5/2003 | Glaser |
| 2003/0085918 A1 | 5/2003 | Beaumont et al. |
| 2003/0093321 A1 | 5/2003 | Bodmer et al. |
| 2003/0093531 A1 | 5/2003 | Yeung et al. |
| 2003/0093580 A1 | 5/2003 | Thomas et al. |
| 2003/0097361 A1 | 5/2003 | Huang et al. |
| 2003/0098881 A1 | 5/2003 | Nolte et al. |
| 2003/0098893 A1 | 5/2003 | Makinen et al. |
| 2003/0101200 A1 | 5/2003 | Koyama et al. |
| 2003/0105745 A1 | 6/2003 | Davidson et al. |
| 2003/0107597 A1 | 6/2003 | Jameson |
| 2003/0110188 A1 | 6/2003 | Howard et al. |
| 2003/0115218 A1 | 6/2003 | Bobbitt et al. |
| 2003/0117403 A1 | 6/2003 | Park et al. |
| 2003/0117422 A1 | 6/2003 | Hiyama et al. |
| 2003/0120678 A1 | 6/2003 | Hill et al. |
| 2003/0120928 A1 | 6/2003 | Cato et al. |
| 2003/0120952 A1 | 6/2003 | Tarbotton et al. |
| 2003/0122873 A1 | 7/2003 | Dieberger et al. |
| 2003/0126136 A1 | 7/2003 | Omoigui |
| 2003/0126212 A1 | 7/2003 | Morris et al. |
| 2003/0135495 A1 | 7/2003 | Vagnozzi |
| 2003/0135513 A1 | 7/2003 | Quinn et al. |
| 2003/0135517 A1 | 7/2003 | Kauffman |
| 2003/0135659 A1 | 7/2003 | Bellotti et al. |
| 2003/0140115 A1 | 7/2003 | Mehra |
| 2003/0154185 A1 | 8/2003 | Suzuki et al. |
| 2003/0158855 A1 | 8/2003 | Farnham et al. |
| 2003/0177422 A1 | 9/2003 | Taroukhine et al. |
| 2003/0184587 A1 | 10/2003 | Ording et al. |
| 2003/0195950 A1 | 10/2003 | Huang et al. |
| 2003/0210281 A1 | 11/2003 | Ellis et al. |
| 2003/0212664 A1 | 11/2003 | Breining |
| 2003/0212680 A1 | 11/2003 | Bates et al. |
| 2003/0212710 A1 | 11/2003 | Guy |
| 2003/0222915 A1 | 12/2003 | Marion et al. |
| 2003/0225796 A1 | 12/2003 | Matsubara |
| 2003/0227480 A1 | 12/2003 | Polk |
| 2003/0227487 A1 | 12/2003 | Hugh |
| 2003/0233419 A1 | 12/2003 | Beringer |
| 2004/0001106 A1 | 1/2004 | Deutscher et al. |
| 2004/0002993 A1 | 1/2004 | Toussaint et al. |
| 2004/0003247 A1 | 1/2004 | Fraser et al. |
| 2004/0004638 A1 | 1/2004 | Babaria |
| 2004/0006549 A1 | 1/2004 | Mullins et al. |
| 2004/0008226 A1 | 1/2004 | Manolis et al. |
| 2004/0019584 A1 | 1/2004 | Greening et al. |
| 2004/0019655 A1 | 1/2004 | Uemura et al. |
| 2004/0019875 A1 | 1/2004 | Welch |
| 2004/0030731 A1 | 2/2004 | Iftode et al. |
| 2004/0044696 A1 | 3/2004 | Frost |
| 2004/0044776 A1 | 3/2004 | Larkin |
| 2004/0054674 A1 | 3/2004 | Carpenter et al. |
| 2004/0056894 A1 | 3/2004 | Zaika et al. |
| 2004/0056896 A1 | 3/2004 | Doblmayr et al. |
| 2004/0059755 A1 | 3/2004 | Farrington |
| 2004/0068524 A1 | 4/2004 | Aboulhosn et al. |
| 2004/0070612 A1 | 4/2004 | Sinclair et al. |
| 2004/0073705 A1 | 4/2004 | Madril, Jr. et al. |
| 2004/0083433 A1 | 4/2004 | Takeya |
| 2004/0085581 A1 | 5/2004 | Tonkin |
| 2004/0088374 A1 | 5/2004 | Webb et al. |
| 2004/0091175 A1 | 5/2004 | Beyrouti |
| 2004/0098370 A1 | 5/2004 | Garland et al. |
| 2004/0098379 A1 | 5/2004 | Huang |
| 2004/0098742 A1 | 5/2004 | Hsieh et al. |
| 2004/0103073 A1 | 5/2004 | Blake et al. |
| 2004/0103280 A1 | 5/2004 | Balfanz et al. |
| 2004/0105127 A1 | 6/2004 | Cudd et al. |
| 2004/0117358 A1 | 6/2004 | Von Kaenel et al. |
| 2004/0117405 A1 | 6/2004 | Short et al. |
| 2004/0128322 A1 | 7/2004 | Nagy |
| 2004/0133572 A1 | 7/2004 | Bailey et al. |
| 2004/0133588 A1 | 7/2004 | Kiessig et al. |
| 2004/0133845 A1 | 7/2004 | Forstall et al. |
| 2004/0142749 A1 | 7/2004 | Ishimaru et al. |
| 2004/0143349 A1 | 7/2004 | Roberts et al. |
| 2004/0148434 A1 | 7/2004 | Matsubara et al. |
| 2004/0153451 A1 | 8/2004 | Phillips et al. |
| 2004/0153968 A1 | 8/2004 | Ching et al. |
| 2004/0167942 A1 | 8/2004 | Oshinsky et al. |
| 2004/0168118 A1 | 8/2004 | Wong |
| 2004/0174396 A1 | 9/2004 | Jobs et al. |
| 2004/0177116 A1 | 9/2004 | McConn et al. |
| 2004/0177148 A1 | 9/2004 | Tsimelzon, Jr. |
| 2004/0177319 A1 | 9/2004 | Horn |
| 2004/0181516 A1 | 9/2004 | Ellwanger et al. |
| 2004/0183824 A1 | 9/2004 | Benson et al. |
| 2004/0189704 A1 | 9/2004 | Walsh et al. |
| 2004/0189707 A1 | 9/2004 | Moore et al. |
| 2004/0193594 A1 | 9/2004 | Moore et al. |
| 2004/0193599 A1 | 9/2004 | Liu et al. |
| 2004/0193600 A1 | 9/2004 | Kaasten et al. |
| 2004/0193621 A1 | 9/2004 | Moore et al. |
| 2004/0193672 A1 | 9/2004 | Samji et al. |
| 2004/0193673 A1 | 9/2004 | Samji et al. |
| 2004/0199507 A1 | 10/2004 | Tawa |
| 2004/0205168 A1 | 10/2004 | Asher |
| 2004/0205625 A1 | 10/2004 | Banatwala et al. |
| 2004/0205633 A1 | 10/2004 | Martinez et al. |
| 2004/0205698 A1 | 10/2004 | Schliesmann et al. |
| 2004/0215600 A1 | 10/2004 | Aridor et al. |
| 2004/0220899 A1 | 11/2004 | Barney et al. |
| 2004/0223057 A1 | 11/2004 | Oura et al. |
| 2004/0225650 A1 | 11/2004 | Cooper et al. |
| 2004/0230572 A1 | 11/2004 | Omoigui |
| 2004/0230599 A1 | 11/2004 | Moore et al. |
| 2004/0230917 A1 | 11/2004 | Bales et al. |
| 2004/0233235 A1 | 11/2004 | Rubin et al. |
| 2004/0243597 A1 | 12/2004 | Jensen et al. |
| 2004/0249902 A1 | 12/2004 | Tadayon et al. |
| 2004/0255048 A1 | 12/2004 | Lev Ran et al. |
| 2004/0257169 A1 | 12/2004 | Nelson |
| 2005/0004928 A1 | 1/2005 | Hamer et al. |
| 2005/0010860 A1 | 1/2005 | Weiss et al. |
| 2005/0015405 A1 | 1/2005 | Plastina et al. |
| 2005/0027757 A1 | 2/2005 | Kiessig et al. |
| 2005/0050470 A1 | 3/2005 | Hudson et al. |
| 2005/0055306 A1 | 3/2005 | Miller et al. |
| 2005/0071355 A1 | 3/2005 | Cameron et al. |
| 2005/0080807 A1 | 4/2005 | Beilinson et al. |
| 2005/0097477 A1 | 5/2005 | Camara et al. |
| 2005/0114672 A1 | 5/2005 | Duncan et al. |
| 2005/0120242 A1 | 6/2005 | Mayer et al. |
| 2005/0131903 A1 | 6/2005 | Margolus et al. |

| | | | |
|---|---|---|---|
| 2005/0131905 A1 | 6/2005 | Margolus et al. | |
| 2005/0138567 A1 | 6/2005 | Smith et al. | |
| 2005/0149481 A1 | 7/2005 | Hesselink et al. | |
| 2005/0165753 A1 | 7/2005 | Chen et al. | |
| 2005/0166159 A1 | 7/2005 | Mondry et al. | |
| 2005/0171947 A1 | 8/2005 | Gautestad | |
| 2005/0192953 A1 | 9/2005 | Neale et al. | |
| 2005/0192966 A1 | 9/2005 | Hilbert et al. | |
| 2005/0243993 A1 | 11/2005 | McKinzie et al. | |
| 2005/0246331 A1 | 11/2005 | De Vorchik et al. | |
| 2005/0246643 A1 | 11/2005 | Gusmorino et al. | |
| 2005/0246664 A1 | 11/2005 | Michelman et al. | |
| 2005/0256909 A1 | 11/2005 | Aboulhosn et al. | |
| 2005/0257169 A1 | 11/2005 | Tu | |
| 2005/0283476 A1 | 12/2005 | Kaasten et al. | |
| 2006/0004692 A1 | 1/2006 | Kaasten et al. | |
| 2006/0020586 A1 | 1/2006 | Prompt et al. | |
| 2006/0036568 A1 | 2/2006 | Moore et al. | |
| 2006/0080308 A1 | 4/2006 | Carpentier et al. | |
| 2006/0129627 A1 | 6/2006 | Phillips et al. | |
| 2006/0173873 A1 | 8/2006 | Prompt et al. | |
| 2006/0200455 A1 | 9/2006 | Wilson | |
| 2006/0200466 A1 | 9/2006 | Kaasten et al. | |
| 2006/0200832 A1 | 9/2006 | Dutton | |
| 2006/0218122 A1 | 9/2006 | Poston et al. | |
| 2007/0180432 A1 | 8/2007 | Gassner et al. | |

FOREIGN PATENT DOCUMENTS

| | | | |
|---|---|---|---|
| GB | 2329492 A | | 7/1998 |
| JP | 09244940 | | 9/1997 |
| JP | 2001067250 | | 3/2001 |
| JP | 2001142766 | | 5/2001 |
| JP | 2001154831 | | 6/2001 |
| JP | 2001188702 | | 7/2001 |
| JP | 2002099565 | | 4/2002 |
| JP | 2002182953 | | 6/2002 |
| JP | 2002334103 | | 11/2002 |
| JP | 2002269145 | | 4/2004 |
| NO | 20042749 | | 8/2009 |
| WO | WO9322738 | | 11/1993 |
| WO | WO9412944 | | 6/1994 |
| WO | WO9414281 | | 6/1994 |
| WO | 9938092 | | 7/1999 |
| WO | WO9949663 | | 9/1999 |
| WO | WO0051021 | | 8/2000 |
| WO | 01/63919 | A1 | 8/2001 |
| WO | WO0157867 | | 8/2001 |
| WO | WO0167668 | | 9/2001 |
| WO | WO 0225420 | | 3/2002 |
| WO | WO03001720 | | 1/2003 |
| WO | WO 2004107151 | | 9/2004 |
| WO | WO2004097680 | | 11/2004 |

OTHER PUBLICATIONS

Microsoft Press Pass, "Windows XP is Here!", New York, Oct. 25, 2001.

Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.

McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.

Stanek R. William, "Microsoft Windows XP Professional Administrator's Pocket Consultant", Sep. 25, 2001; Microsoft Press, Chapter 9, printed pp. 1-8.

Shah, Sarju, "Windows XP Preview", FiringSquad, May 4, 2001, online, printed pp. 1-5; Figure: Hi-Res Image Viewer.

European Search Report for 03007909.9-2211 dated Jun. 30, 2006.

D. Esposito, More Windows 2000 UI Goodies: Extending Explorer Views by Customizing Hypertext Template Files, MSDN Magazine, <http://msdn.microsoft.com/msdnmag/issues/0600/w2kui2/default.aspx?print=true?, first date of publication unknown but no later than Jun. 2000, 15 pages.

Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.

Australian Search Report for SG 200301764-7 dated Mar. 30, 2006.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Australian Written Opinion for SG 200301764-7 dated Mar. 30, 2006.

Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.

Directory Opus 6.1—Viewer SDK Plugin SDK 1.0, GP Software, 2001, <http://web.archive.org/web/20030219151121/ www.gpsoft.com.au/Developer.html>, first date of publication unknown but, prior to Feb. 19, 2003, 30 pages.

Wikipedia, File Allocation Table, 2006, <http://en.wikipedia.org/wiki/File_Allocation_Table>.

Cohen, et al., "A Case for Associative Peer to Peer Overlays"-ACM SIGCOMM Computer Communications Review, vol. 33, No. 1, Jan. 2003, pp. 95-100.

Lui, et al., "Interoperability of Peer-to-Peer File Sharing Protocols"-ACM SIGecom Exchanges, vol. 3, No. 3, Aug. 2002, pp. 25-33.

Adobe, Inc., et al., "Adobe Photoshop CS Classroom in a Book," Dec. 1, 2003, pp. 1-29.

Adobe, Inc., et al., "Adobe Photoshop 7.0", 2001; pp. 1-9.

Heinlein, et al., "Integration of Message Passing and Shared Memory in the Stanford FLASH Multiprocessor, Architectural Support for Programming Languages and Operating Systems," pp. 38-50, published 1994.

Louis, et al., "Context Learning Can Improve User Interaction Information Reuse and Integration," Proceedings of the 2004 IEEE International Conference on, pp. 115-120, Nov. 8-10, 2004.

Microsoft Windows XP Version 2002 (Screen Dumps, Figs. 1-16).

Simpson, Alan, Windows 95 Uncut, 1995, IDG Books Worldwide, Inc., pp. 104-107.

Feng, et al., "Schemata Transformation of Object-Oriented Conceptual Models to XML", Computer systems Science & Engineering, vol. 18, No. 1, Jan. 2003.

Joseph, M., "The UML for Data Modellers," Elektron, Apr. 2004, pp. 72-73.

Wang, G., et al., "Extending XML Schema with Nonmonotonic Inheritance," in M.A. Jesufeld and O. Paster (eds.), ER 2003 Workshops, Lecture Notes in Computer Science 2814:402-407,2003.

Lee, J., "An End-User Perspective on File-Sharing Systems," Communications of the ACM 46(2):49-53, Feb. 2003.

Ohtani, A., et al., "A File Sharing Method for Storing Area Network and Its Performance Verification," NEC Res. & Develop. 44(1):85-90, Jan. 2003.

H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.

Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.

R. Rao, et al., "Rich Interaction in the Digital Library," Communications of the ACM 38(4):29-39.1995.

Piernas, J., et al., "DualFS: A New Journaling File System Without Meta-Data Duplication," Conference Proceedings of the 2002 International Conference on SUPERCOMPUTING, New York, Jun. 22-26, 2002, p. 137-146.

Manber, U., and S. Wu, "GLIMPSE: A Tool to Search Through Entire File Systems," Proceedings of USENIX Winter 1994 Conference, San Francisco, CA, Jan. 17-21, 1994.

Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.

Gifford, D.K., et al., "Semantic File Systems," Proceedings of the 13th ACM Symposium on Operating Systems Principles, Pacific Grove CA., Sep. 1991, pp. 16-25.

Blair, C., and G.E. Monahan, "Optimal Sequential File Search: A Reduced-State Dynamic Programming Approach," European Journal of Operational Research 86(2):358-365, 1995.

Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.

Na, J., and V. Rajaravivarma, "Multimedia File Sharing in Multimedia Home or Office Business Networks," Proceedings of the 35th Southeastern Symposium on System Theory, Morgantown, W. VA., Mar. 16-18, 2003, pp. 237-241.

Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.

Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.

Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.

Bipin C. Desai, et al., Resource Discovery: Modeling, Cataloguing and Searching, Seventh International Workshop on Database and Expert Systems Applications (DEXA'96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, Et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.

"Predefined Properties" http://help.sap.comIsaphelp—ep50sp5/helpdata/en/Ia/9a4a3b80f2ec40aa7456bc87a94259/content.htm.

"Info Vision Infonnation Management System" http://66.1 02. 7.1 04/search?q=cache:m IXV6K6sQOQJ:www.amlib.netlproducts/infovision.htm+customised+multi+property+file+navigation &hl=en.

"TdcFolderListView component" http://www.appcontrols.comImanualsIdiskcontrols/index.html?tdcfolderlistview.htm.

"Previewing Files" http://developer.apple.comIdocumentation/QuickTimeIINMAC/QT/iqMovieToolbox.1a.htm.

"Text File Previewer 2.0 Beta" http://www .freedownloadscenter.comIUtilitiesIText- ViewersITextI- File ]reviewer.html.

"Your Next OS: Windows 2006?" http://www.pcworld.comInewsiarticle/O.aid.II3'631.OO.asp.

"GetOpenFileName Function," downloaded from <http://msdn.microsoft.com>; date of first publication prior to Mar. 28, 2005; 2 pages.

"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pp.

"Creating an Enhanced Metafile," downloaded from <http://msdn.microsoft.com>; date of first publication prior to Mar. 28, 2005; 2 pages.

"Common Dialog Box Library," downloaded from <http://msdn.microsoft.com>: date of first publication prior to Mar. 28, 2005; 8 pages.

"OPENFILENAME Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Original Sep. 2001). Microsoft Corporation. Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

Examples of dialogs user interfaces; date of first publication prior to Mar. 31, 2005; 8 pages.

"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.

New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.

Windows Forms: Exploiting Windows Longhorn"Features from Within Your Application" (CLI 391); downloaded from http://msdn.microsoft.com/longhorn/pdcmaterials/pdctalksavalon/>; date of first publication prior to Mar. 31, 2005; 27 pages.

MessageBox Function; downloaded from <http://msdn.microsoft.com>; date of first publication prior to Mar. 31, 2005; 4 pages.

Creating and Installing Theme Files; downloaded from <http://msdn.microsoft.com>; date of first publication prior to Feb. 21, 2005; 4 pages.

"About Dialog Boxes"; downloaded from <http://msdn.microsoft.com>; date of first publication prior to Feb. 21, 2005; 10 pages.

"Property Sheets and Inspectors"; downloaded from <http://msdn.microsoft.com>; date of first publication prior to Feb. 21, 2005; 6 pages.

"PROPSHEETPAGE"; downloaded from <http://msdn.microsoft.com>; date of first publication prior to Feb. 21, 2005; 3 pages.

"DialogProc Function"; downloaded from <http://msdn.microsoft.com>; date of first publication prior to Feb. 21, 2005; 2 pages.

"Creating Wizards"; downloaded from <http://msdn.microsoft.com>; date of first publication prior to Mar. 31, 2005; 17 pages.

"Property Sheets"; downloaded from <http://msdn.microsoft.com>; date of first publication prior to Mar. 31, 2005; 7 pages.

"Property Sheet Reference"; downloaded from <http://msdn.microsoft.com>; date of first publication prior to Mar. 31, 2005; 5 pages.

"DRAWITEMSTRUCT Structure"; downloaded from <http://msdn.microsoft.com>; date of first publication prior to Feb. 25, 2005; 3 pages.

"Using Buttons"; downloaded from <http://msdn.microsoft.com>; date of first publication prior to Feb. 25, 2005; 5 pages.

Button Messages; downloaded from <http://msdn.microsoft.com>; date of first publication prior to Feb. 25, 2005; 4 pages.

"Button Styles"; downloaded from <http://msdn.microsoft.com>; date of first publication prior to Feb. 25, 2005; 2 pages.

"CreateWindow Function"; downloaded from <http://msdn.microsoft.com>; date of first publication prior to Feb. 25, 2005; 5 pages.

"Using Dialog Boxes"; downloaded from <http://msdn.microsoft.com>; date of first publication prior to Mar. 31, 2005; 8 pages.

"CreatePropertySheetPage Function"; downloaded from <http://msdn.microsoft.com>; date of first publication prior to Mar. 31, 2005; 1 page.

"DestroyPropertySheetPage Function"; downloaded from <http://msdn.microsoft.com>; date of first publication prior to Mar. 31, 2005; 1 page.

"PropertySheet Function"; downloaded from <http://msdn.microsoft.com>; date of first publication prior to Mar. 31, 2005; 2 pages.

"PropSheetPageProc Function"; downloaded from <http://msdn.microsoft.com>; date of first publication prior to Mar. 31, 2005; 2 pages.

"PropSheetProc Function"; downloaded from <http://msdn.microsoft.com>; date of first publication prior to Mar. 31, 2005; 2 pages.

"PSN_KILLACTIVE Notification"; downloaded from <http://msdn.microsoft.com>; date of first publication prior to Mar. 31, 2005; 1 page.

"PSN_QUERYCANCEL Notification"; downloaded from <http://msdn.microsoft.com>; date of first publication prior to Mar. 31, 2005; 1 page.

"PSN_RESET Notification"; downloaded from <http://msdn.microsoft.com>; date of first publication prior to Mar. 31, 2005; 1 page.

"PSN_SETACTIVE Notification"; downloaded from <http://msdn.microsoft.com>; date of first publication prior to Mar. 31, 2005; 1 page.

"PSN_TRANSLATEACCELERATOR Notification"; downloaded from <http://msdn.microsoft.com>; date of first publication prior to Mar. 31, 2005; 1 page.

"PSN_WIZBACK Notification"; downloaded from <http://msdn.microsoft.com>; date of first publication prior to Mar. 31, 2005; 3 pages.

"PSN_WIZFINISH Notification"; downloaded from <http://msdn.microsoft.com>; date of first publication prior to Mar. 31, 2005; 1 page.

"PSN_WIZNEXT Notification"; downloaded from <http://msdn.microsoft.com; date of first publication prior to Mar. 31, 2005; 3 page.

"PSM_ADDPAGE Message"; downloaded from <http://msdn.microsoft.com>; date of first publication prior to Mar. 31, 2005; 2 pages.

"PSM_IDTOINDEX Message"; downloaded from <http://msdn.microsoft.com>; date of first publication prior to Mar. 31, 2005; 1 page.

"PSM_INDEXTOHWND Message"; downloaded from <http://msdn.microsoft.com>; date of first publication prior to Mar. 31, 2005; 1 page.

"PSM_INDEXTOID Message"; downloaded from <http://msdn.microsoft.com>; date of first publication prior to Mar. 31, 2005; 1 page.

"PSM_INDEXTOPAGE Message"; downloaded from <http://msdn.microsoft.com>; date of first publication prior to Mar. 31, 2005; 1 page.

"PSM_PAGETOINDEX Message"; downloaded from <http://msdn.microsoft.com>; date of first publication prior to Mar. 31, 2005; 1 page.

"PSM_PRESSBUTTON Message"; downloaded from <http://msdn.microsoft.com>; date of first publication prior to Mar. 31, 2005; 1 page.

"PSM_QUERYSIBLINGS Message" ; downloaded from <http://msdn.microsoft.com>; date of first publication prior to Mar. 31, 2005; 1 page.

"PSM_SETCURSEL Message"; downloaded from <http://msdn.microsoft.com>; date of first publication prior to Mar. 31, 2005; 1 page.

"PSM_SETCURSELID Message"; downloaded from <http://msdn.microsoft.com>; date of first publication prior to Mar. 31, 2005; 1 page.

"PSM_SETFINISHTEXT Message"; downloaded from <http://msdn.microsoft.com>; date of first publication prior to Mar. 31, 2005; 1 page.

"PSM_SETHEADERTITLE Message"; downloaded from <http://msdn.microsoft.com>; date of first publication prior to Mar. 31, 2005; 1 page.

"PSM_SETWIZBUTTONS Message"; downloaded from <http://msdn.microsoft.com>; date of first publication prior to Mar. 31, 2005; 2 pages.

"PROPSHEETHEADER Structure" ; downloaded from <http://msdn.microsoft.com>; date of first publication prior to Mar. 31, 2005; 5 pages.

"PROPSHEETPAGE Structure"; downloaded from <http://msdn.microsoft.com>; date of first publication prior to Mar. 31, 2005; 4 pages.

"PSHNOTIFY Structure"; downloaded from <http://msdn.microsoft.com>; date of first publication prior to Mar. 31, 2005; 1 page.

"BCM_GETIDEALSIZE Message"; downloaded from <http://msdn.microsoft.com>; date of first publication prior to Mar. 31, 2005; 1 page.

"PSM_SETTITLE Message"; downloaded from <http://msdn.microsoft.com>; date of first publication prior to Mar. 31, 2005; 1 page.

A.T. McCray, et al., Extending the role of Metadata in a Digital Library System, May 19, 1999, IEEE, pp. 190-199.

Alexa T. McCray, et al., Principles for Digital Library Development, May 2001, ACM, pp. 49-53.

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.

"About Managing Messages with Rules", Microsoft® Outlook® 2003 Help file, 3 pp.

"Trillian/Trillian Pro IM Clients" Products Description, © 1999-2004 Cerulean Studios, <http://www.ceruleanstudios.com> [retrieved Apr. 30, 2004].

International Search Report of WO2004/097638 A1 (McKee, et al.) dated Nov. 11, 2004.

McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.

Langer, Maria, Mac OS X: Visual QuickStart Guide; Apr. 2001, Peachpit Press, Mac OS X Disk Organization (pp. 1-3), Views (pp. 1-11), Outlines (1-3).

Ray, Jay, Mac OS X Unleashed, Nov. 2001, Sams, Chapter 4. The Finder: Working with Files and Applications (pp. 1-15), Getting File Information (pp. 1-7).

International Search Report and Written Opinion of PCT/US04/25931 dated Apr. 3, 2007.

Kuchinsky, et al., "FotoFile: A Consumer Multimedia Organization and Retrieval System", May 1999, ACM, pp. 496-503.

Written Opinion of SG 200301764-7 dated Jan. 11, 2007.

Windows Commander (website), <URL: http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.

Bott, et al., "Microsoft Windows XP Inside Out", Microsoft Press, 2001, Chapter 11, 39 pages.

Bott, et al., Book titled "Special Edition Using Windows 98, Second Edition", Dec. 21, 1999, second edition, pp. 1-7.

Supplementary European Search Report for EP 04780390 dated Jun. 18, 2007.

Ferri, Fernando, et al. "An Object-Oriented Model for a Multi-Media Patient Folder Management System," ACM SIBGIO Newsletter, vol. 16, Issue 1, Jun. 1996, pp. 2-18.

Anonymous, "Organize Your Digital Media Collection," Jun. 30, 2003, 3 pages, www.microsoft.com/windowsxp/using/windowsmediaplayer/getstarted/organize.mspx.

Anciaux, et al., "A Tamper-Resistant and Portable Healthcare Folder," Hindawai Publishing Corporation, International Journal of Telemedicine and Applications, vol. 2008, Article ID 763534, pp. 1-9.

Cohen, J. "The Unofficial Guide to the Workplace Shell," Apr. 5, 1992, 45 pages, http://www.verfasser.de/web/web.nsf/c5.

Cooper, A., "About Face The Essentials of User Interface Design," IDG Books, 1995, p. 141.

Campbell, David, "Extending the Windows Explorer with Name Space Extensions," Microsoft Systems Journal, Microsoft Corporation, vol. 5, No. 6, Jul. 1996, pp. 89-96.

Dorot, V., "Explanatory Dictionary on Modern Computer Vocabulary," S. Petersburg, BHV-Petersburg, pp. 218-219.

Bott, Ed et al., "Master Your Music Library," May 5, 2003, 7 pages, www.microsoft.com/windowsxp/using/windowsmediaplayer/expert/bott_03may05.mspx.

International Search Report of PCT/US05/26655.

Rathbone, Andy, "Windows XP for Dummies," 2001, Wiley Publishing, Inc., pp. 145, 203, 204.

Sugasawa, Eiji, "When and What of Pictures Become Clear! How to Readily Organize Images from Digital Cameras," Nikkei PC Beginners, vol. 2, No. 4, pp. 78-95, Nikkei Business Publications, Inc., Japan.

Grosky, et al., "Using Metadata for Intelligent Browsing of Structured Media Objects," Dec. 1994, Sigmond Record, vol. 23, No. 4, pp. 49-56.

Sellen, Abigail J. et al., "How Knowledge Workers Use the Web," Proceedings of the SIGCHI Conference on Human Factors in Computing Systems: Changing Our World, Changing Ourselves, ACM, 2002, pp. 227-234.

Miles, Darryl, "Implementing Windows Terminal Server and Citrix MetaFrame on IBM @ Server X Series Servers," Apr. 2003, pp. 1-62.

Jamsa, K., "1001 Windows 98 Tips," 1998, 2 pages, Jamsa Press.

Sekiguchi, Kumiko, "Visual Basic Q&A," MSDN Magazine 2001, No. 16, Jul. 18, 2001, pp. 97-103, ASCII Inc., Japan.

Capretz, Luiz F. et al., "Component-Based Software Development," Nov. 2001, pp. 1834-1837, IECON '01, The 27th Annual Conference of the IEEE Industrial Electronics Society.

Russionovich, Mark, "Internal Structure of NTFS4.0," Aug. 1, 2001, pp. 176-182, NIKKEI Windows 2000, vol. 2, No. 53, Nikkei Business Publications, Inc., Japan.

Halvorson, Michael, et al, "Microsoft Office XP, Professional Office Manual," Jul. 23, 2001, pp. 78-80, first edition, Nikkei BP Soft Press.

Microsoft Corporation, "Windows 98 Step by Step," 1998, p. 63, Microsoft Press.

Microsoft Windows XP Professional, 1985-2001.

Microsoft Windows XP Professional, Screen Shots 1-8, copyright (1985-2001).

Microsoft Windows XP Version 2002 Screen Dumps.

Olive, et al., "A Generic Metadata Query Tool", 1999, pp. 1-8.

Patent Abstracts of Japan, Publication No. 2002-099565, Information Retrieval Apparatus, Abstract, May 4, 2002, 1 page.

Patent Abstracts of Japan, Publication No. 2002-334103, Retrieval Processing System and Retrieval Processing Method, Abstract, Nov. 22, 2002, 1 page.

Dourish, Paul, et al., "Presto: An Experimental Architecture for Fluid Interactive Document Spaces," ACM Transactions on Computer—Human Interaction (TOCHI) Jun. 1999, pp. 133-161, vol. 6, Issue 2, ACM.

"Revelle, A Visual Search Tool for Early Elementary Science Students," Mar. 2002, pp. 49-57, vol. 11, Journal of Science Education and Technology.

Zhujun, Xu James, "Survey of Some Mobile Agent System," Feb. 10, 2003, pp. 1-22.

Northrup, Tony, et al., "Plus! Party Mode: Mix Audio and Video in Playlists," Mar. 17, 2003, 6 pages, www.microsoft.com/windowsxp/using/windowsmediaplayer/expert/northrup_03march17.mspx.

Verhoeven, et al., Generic Metadata Tool, 10-19999, pp. 1-8.

Server, Garrett, "Previewing Files in the Common Dialog," Mar. 2, 2003, 3 pages, http://www.elitevb.com/content/01,0084,01/.

English translation of Official Notice of Rejection for JP2003125924 dated Nov. 21, 2008.

\* cited by examiner

SYSTEM AND METHOD FOR DISPLAYING STACK ICONS

CROSS-REFERENCE TO RELATED APPLICATIONS

None

STATEMENT REGARDING FEDERALLY SPONSORED RESEARCH OR DEVELOPMENT

None.

TECHNICAL FIELD

Embodiments of the present invention relate to enhancement of a computer user experience. More particularly, embodiments of the invention relate to providing a technique for displaying groups of items to a user in a descriptive manner.

BACKGROUND OF THE INVENTION

In current computer operating system environments, icons are provided for representing items such as files, folders, shortcuts, applications, documents, tasks, and commands. Icons may be used in list views, toolbars, dialog boxes, menus, and other places. Icons may be used to represent all objects of a specific class, such as Microsoft Word documents, Microsoft Excel files, jpeg files, or other types of files.

Icons may include thumbnail images used to represent specific objects, such as a specific jpeg or a specific folder. Icons may be dynamically generated by code run on a user's machine or may be cached. Icons have existed for many years and many applications use existing icon architectures. Application and component developers can, using custom icons and thumbnails, convey as much information about objects as their pixels will allow. However, existing systems do not provide a technique for graphically grouping multiple icons based on properties of the files represented.

Currently, when a user wants to group items having common characteristics, the user often groups the items into a folder. For example, a user can group documents by file type to include one group for Microsoft Word documents, one for Microsoft Excel documents, one for Microsoft PowerPoint documents, etc. A user may also group music by genre, creating separate groups for Pop, Classical, Hip-Hop, etc. While the conventional folder structure and icon may provide easy access to the documents, the generic folder icon fails to provide descriptive information pertaining to items within the folder.

A solution is needed for visually representing these groups to the user. The use of a generic icon such as the generic folder icon to represent groups of items has a number of shortcomings. First, using a generic icon to represent a group will not provide a user with any idea of how many items are in the group. In contrast, in a real-world stack view, a user is able to view an approximate number of items in the stack. It would be desirable to have an icon represent a real-world stack view in which the group of items could be viewed as a stack and in which a viewer can view the size of the stack and see relative stack sizes merely by viewing the stack. Additionally, a solution is needed that allows the user to see the types of items that the stack contains. Furthermore, a solution should be provided that is capable of conveying the concept of an empty stack.

Accordingly, a solution is needed for immediately conveying to a user the size of a stack and the character of items within the stack. The solution should allow users to view stacks of items and infer characteristics of the stack based on the representation of the stack.

BRIEF SUMMARY OF THE INVENTION

Embodiments of the present invention are directed to a method for representing files stored in stacks. The method includes providing a set of stack icons, each icon in the set having a stack height representing a range of stack sizes. The method additionally includes determining a stack size for a selected stack and selecting and displaying an appropriate stack icon from the set of stack icons based on the determined stack size.

In another aspect of the invention, a method is provided for representing a selected stack of files, wherein the selected stack is stored within one of multiple libraries. The method includes providing an icon for each library. Each icon for each library portrays information relevant to the library. The method additionally includes storing multiple icons portraying the relevant information for each library, wherein each of the multiple icons in each library represents a range of stack heights. The method additionally includes representing a selected stack by determining an appropriate library and an appropriate stack height and displaying a corresponding icon.

In yet an additional aspect of the invention, a system is provided for representing a selected stack of files. The system includes stored sets of default stack icons, each stored set of default stack icons representing and portraying information relevant to a corresponding library. Each stored set of default stack icons includes multiple icons and each included icon represents a range of stack heights. The system additionally includes icon selection tools for determining if the selected stack of files belongs to a library having a corresponding stored set of default icons and for determining an appropriate stack height. Upon locating an appropriate library and stack height, the icon selection tools select and display an appropriate icon from an appropriate set of default icons.

In further aspects of the invention, thumbnail icons and property-based icons may be provided. Additionally, each stored set of icons may include a unique empty set icon for indicating that a stack is empty.

BRIEF DESCRIPTION OF THE DRAWINGS

The present invention is described in detail below with reference to the attached drawings figures, wherein.

DETAILED DESCRIPTION OF THE INVENTION

I. System Overview

Embodiments of the invention include a method and system for displaying stacks of items having common properties. The system and method provide a technique for displaying the number of items in a stack on a stack icon. Furthermore, the stack icon visually represents the height of the stack, such that the stack depicted in the icon varies depending on the relative size of the stack compared to other stacks in the view. Stack icons are depicted to include different kinds of items (documents, photos, videos, music, contacts, etc.) depending on the library in which the stack is being represented. Furthermore, in accordance with embodiments of the invention, a completely different image is used to represent empty stacks than non-empty stacks. When there is an icon available to represent a certain property, that icon is overlaid on the stack icon based on that property. For some special types of stacks, such as stacks of photos and videos, the stack icon includes thumbnails of items from within the stack itself.

The system and method may be implemented in a computerized environment. An exemplary operating environment is described in detail below with reference to FIG. 1.

II. Exemplary Operating Environment

Figure 1:
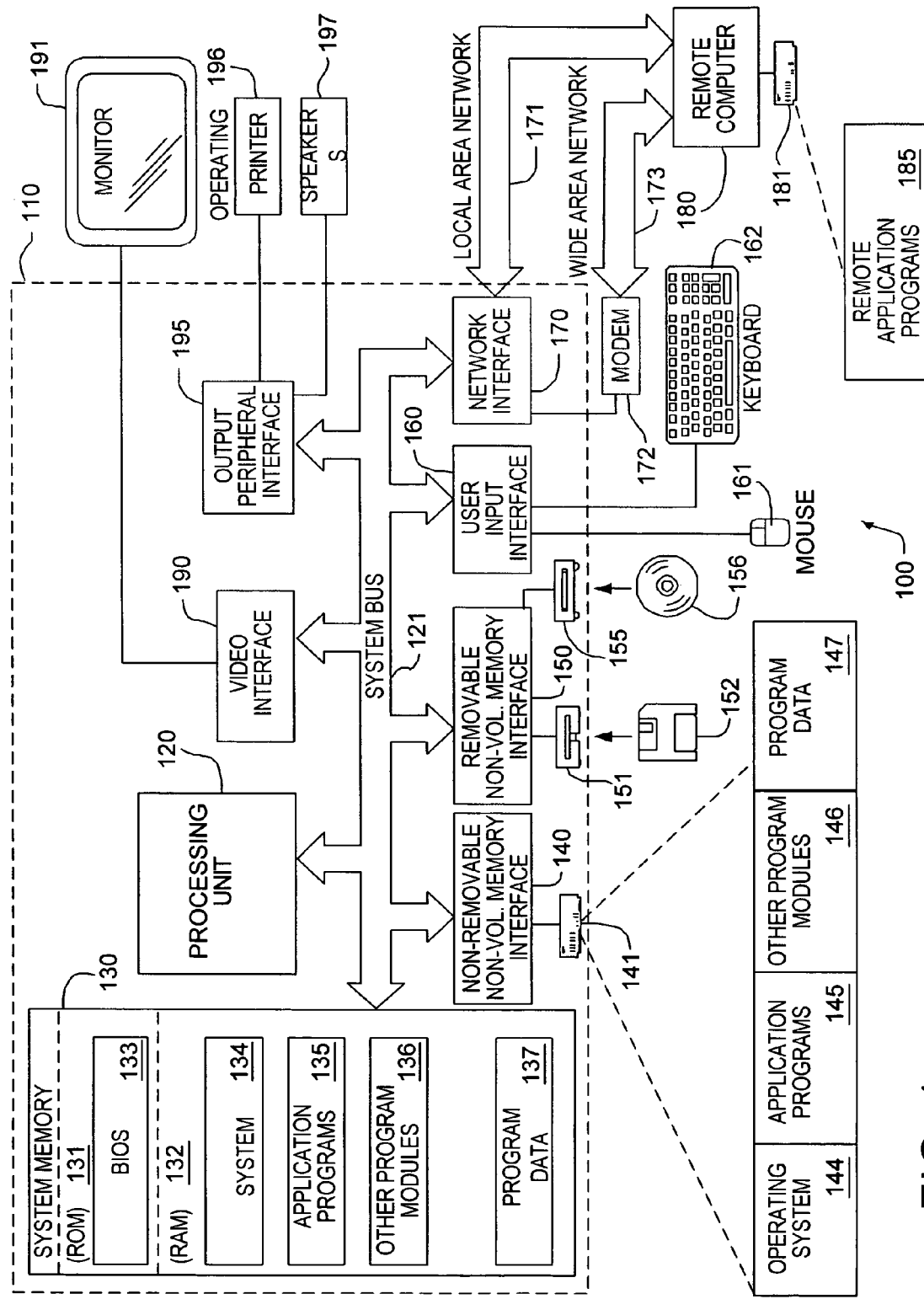
FIG. 1 is a block diagram illustrating a computerized environment in which embodiments of the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or non-volatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. Stack Icon Selection and Display Module

Figure 2:
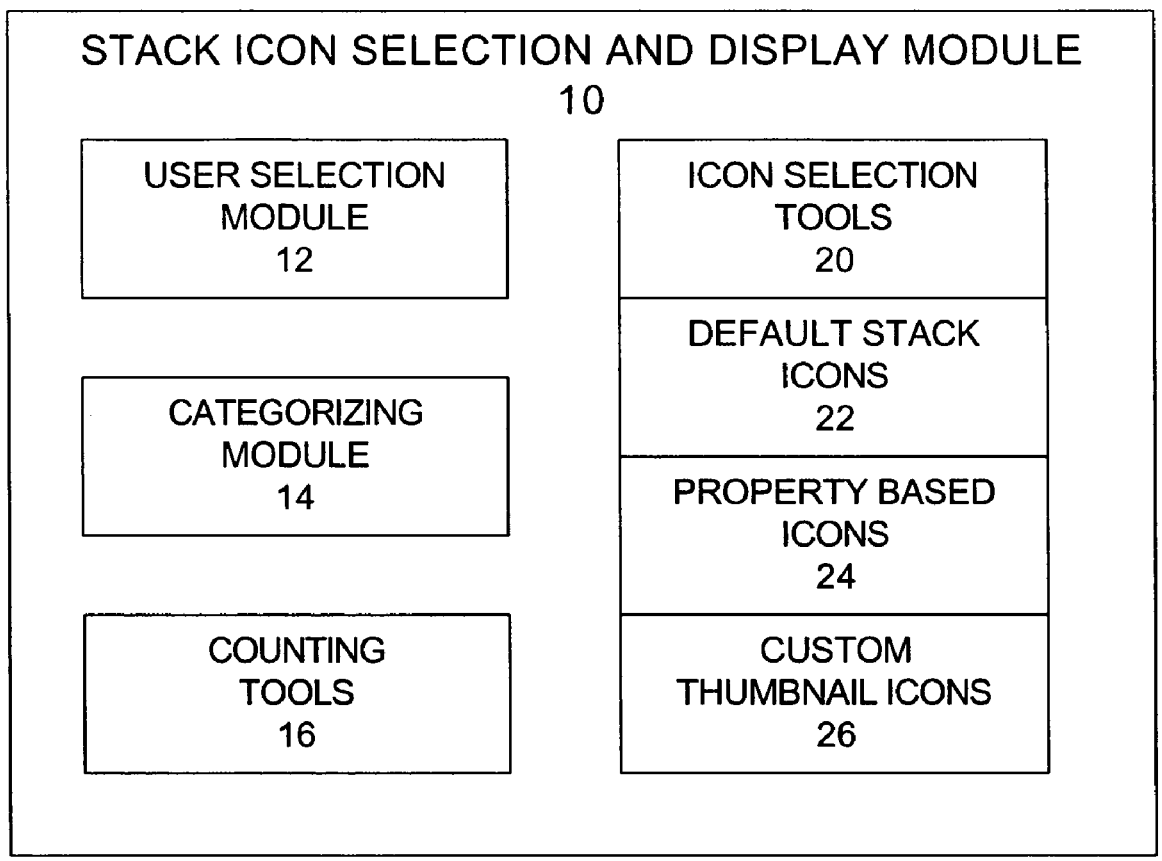
FIG. 2 is a block diagram illustrating a stack selection and display module in accordance with an embodiment of the invention.

FIG. 2 illustrates a stack icon selection and display module 10. The stack icon selection and display module 10 is preferably implemented in the computerized environment 100 illustrated in FIG. 1 and may operate from within the RAM 132 or other memory device. The stack icon selection and display module 10 may include a user selection module 12, a categorizing module 14, and counting tools 16. The stack icon selection and display module 10 may additionally include icon selection tools 20, default stack icons 22, property based icons 24, and custom thumbnail icons 26.

The user selection module 12 enables a user to group items having common properties into a stack. As described above, the stacks may share a common file type or other characteristic.

The categorizing module 14 categorizes the selected items in accordance with the shared common property. Stack icons are depicted to include different kinds of items such as documents, photos, videos, music, contacts, etc. The particular depiction will depend upon the library in which the stack is being represented.

The counting tools 16 count the number of selected items to be provided on the stack. As will be further illustrated below, the number of items in a stack is displayed on the stack icon itself. Furthermore, the height of the stack depicted in a stack icon varies depending on the relative size of the stack compared to other stacks in the view. Additionally, the counting tools 16 are capable of determining if a selected stack is empty. A completely different image is used to represent empty stacks than non-empty stacks.

The icon selection tools 20 select an appropriate icon from three categories of available icons. The three categories of available icons include default stack icons 22, property-based icons 24, and thumbnail icons 26. While typically a default icon is provided for each library, if there is an icon available to represent a certain property, that icon may be overlaid on the stack icon based on that property. The custom thumbnail icons 26 may be provided for some special types of stacks, such as stacks of photos and videos. The thumbnail stack icon includes thumbnails of items from within the stack itself.

With further reference to the icon selection tools 20, each icon is provided in multiple stack sizes as will be further described below. The icon selection tools 20 may implement an algorithm to select the appropriate stack size within a category.

Icon Characteristics

Three categories of stack icons may be provided for the system of the invention. As set forth above, these categories may include default stack icons, property-based stack icons, and thumbnail stack icons. Each of the main libraries including the document library, photo library, video library, music and radio library, contacts library, message library, and television and movie library may include a set of default stack icons. A set of generic default stack icons may be provided for use in non-library views.

Figure 4:
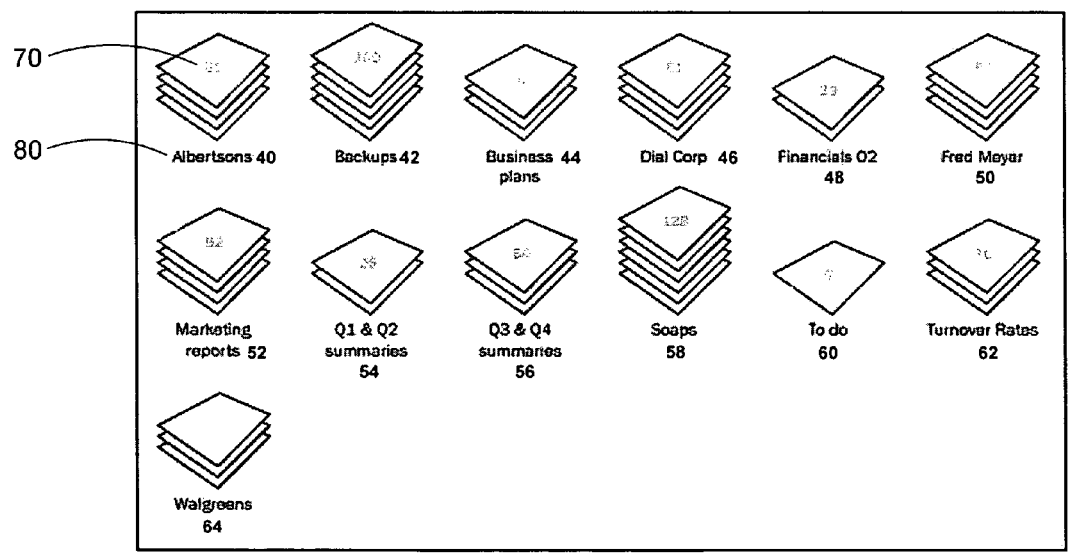
FIG. 4 is a diagram illustrating stack icons for documents in accordance with an embodiment of the invention.

FIG. 4 illustrates a wire-frame model of stack icons for documents. The illustrated display includes stacks 40, 42, 44, 46, 48, 50, 52, 54, 56, 58, 60, 62, and 64. Each stack includes a caption 80 appropriate for each item in the stack. Furthermore, on the face of each stack is designator 70 for indicating a number of items contained within the stack. For instance, the stack 52 includes a caption "marketing reports" and 92 documents are contained in the stack. Stack 60 includes a "to do" caption and two documents are contained within the stack. The size displayed for each stack is related to the number of items in the stack. For instance, the stack 52 is shown as larger than the stack 60 because the stack 52 contains more items than the stack 60.

As shown, each set of default stack icons includes multiple icons, each icon representing a stack of a distinct size. In an embodiment of the invention, five icons are provided for representing stacks of different sizes. In this instance, the sizes are characterized as large, medium, small, two, and zero. Various criteria are relevant to selecting which stack icon is shown. The size of the stack icon should indicate the relative size of the stack compared to other stacks in that same view. A stack should not be visually represented as having more items than it actually contains, except in the case of a stack of just one item. An exemplary algorithm for selecting the appropriate size is described below with regard to the method of the invention.

Default Stack Icons

FIGS. 5A-5E illustrate multiple embodiments of default stack icons. Each of the main libraries in an operating system may have a set of default stack icons. A set of generic default stack icons may be included for non-library views. In the illustrated embodiments, the operating system provides a documents library, a photo and video library, a music and radio library, a contacts library, and a message library.

Figure 5A:
FIGS. 5A-5E illustrate stack icons for various types of items in accordance with an embodiment of the invention.

FIG. 5A illustrates multiple default stack icons 502, 504, 506, 508, and 510 within the documents library. The icons used for the stack emulate the documents they represent. Additionally, as shown in an upper left corner of each stack, the number of items contained within the stack is displayed. The larger stacks are shown with a greater number of icons that the smaller stacks. Stack 510 utilizes a unique "empty stack" icon.

Figure 5B:
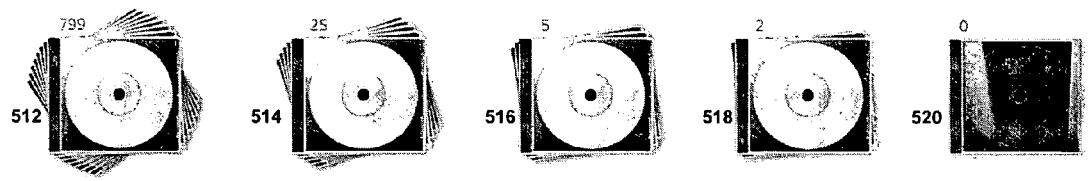

FIG. 5B illustrates multiple default stack icons 512, 514, 516, 518, and 520 within the music and radio library. As set forth above, a number in the upper left corner of each stack indicates a number of items in the stack. The icons are representative of the content of the library. In the embodiment of FIG. 5B, compact disc (CD) cases are used as icons. Furthermore, the final stack 520 is an empty stack and includes a unique icon showing an empty CD case. As set forth above, larger stacks are shown with a greater number of stacked icons than smaller stacks.

Figure 5C:
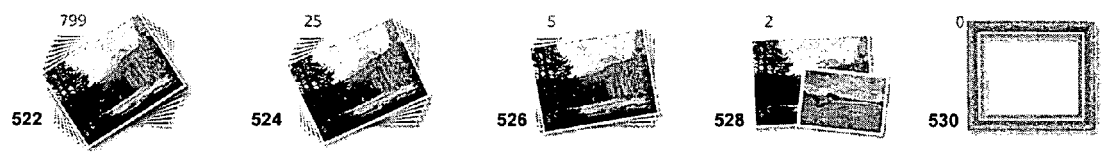

FIG. 5C illustrates multiple default stack icons 522, 524, 526, 528, and 530 within the photograph library. As set forth above, a number in the upper left corner of each stack indicates a number of items in the stack. The icons are representative of the content of the library. In the embodiment of FIG. 5C, a photograph is used as an icon. Furthermore, the final stack 530 is an empty stack and includes a unique icon showing an empty picture frame. As set forth above, larger stacks are shown with a greater number of stacked icons than smaller stacks.

Figure 5D:

FIG. 5D illustrates multiple default stack icons 532, 534, 536, 538, and 540 within the contacts library. As set forth above, a number in the upper left corner of each stack indicates a number of items in the stack. Larger stacks are shown with a greater number of stacked icons than smaller stacks. The icons are representative of the content of the library. In the embodiment of FIG. 5D, a contact card is used as the stack icon. Furthermore, the final stack 540 is an empty stack and includes a unique icon showing an empty contact card.

Figure 5E:
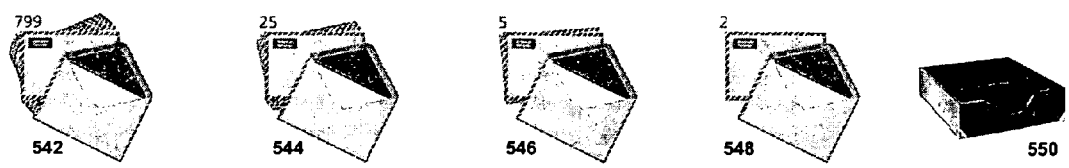

FIG. 5E illustrates multiple default stack icons 542, 544, 546, 548, and 550 within the message library. As set forth above, a number in the upper left corner of each stack indicates a number of items in the stack. Larger stacks are shown with a greater number of stacked icons than smaller stacks. The icons are representative of the content of the library. In the embodiment of FIG. 5E, an envelope is used as the stack icon. Furthermore, the final stack 540 is an empty stack and includes a unique icon showing an empty inbox.

As illustrated in FIGS. 5A-5E, each set of default stack icons includes five icons representing stacks of different sizes. In embodiments of the invention, these sizes include a large size, a medium size, a small size, a "two" sized icon, and an empty stack or "zero" icon. The selection of the appropriate default icon is based on the size of the stack and is further described below with reference to the method of the invention.

Figure 6:
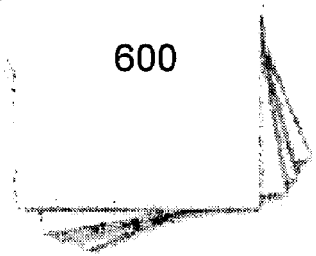
FIG. 6 illustrates a generic default stack icon in accordance with an embodiment of the invention.

FIG. 6 illustrates a generic default stack icon 600. This icon may be used to represent items in non-library views. The generic default stack icon may also be provided in multiple sizes conforming to those described above.

Property-Based Stack Icons

Figure 7:
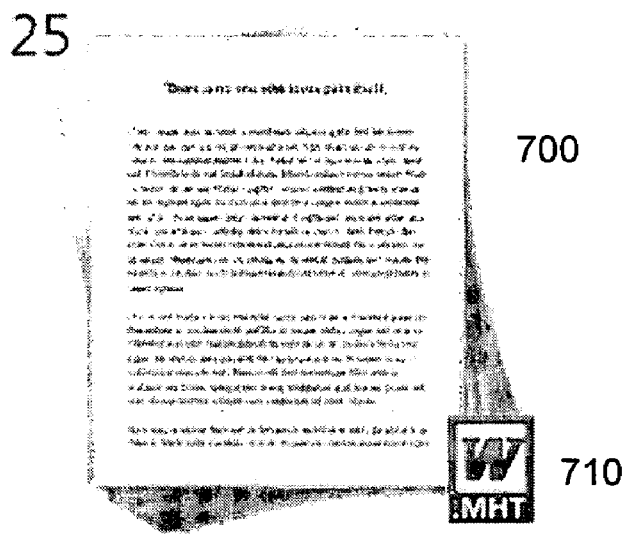
FIG. 7 illustrates a file type overlay on a stack icon in accordance with an embodiment of the invention.

FIG. 7 illustrates an embodiment of a property based stack icon 700. The icon 700 is the icon for the document library, but includes a file type overlay 710 indicating a file type. The property-based stack icons are composed from the appropriate default stack icon for the library and an additional icon that represents a property. Property-based stack icons may be available from multiple libraries. For example, in the document library, the music library, or the photo library, the additional icon may be provided to indicate file type. Alternatively, an additional icon may be provided in the document library or photo library to indicate the date or month in which the displayed stack was created. Other types of property-based stack icons may also be available.

The overlay 710 is used to convey what type of object the icon portrays. An application may provide such an overlay for each file-type it owns, but if none is provided for a particular file-type, then the application's own icon may be used as the overlay. The placement of the overlay is shown as aligned exactly along the bottom edge of the image such that it fits within the boundaries of the icon when the image is bottom-aligned. Horizontally, the type overlay may be centered on the right edge of the image, but can be shown in other positions.

Overlays may be stored in the following pixel sizes: 48×48, 32×32, 24×24, 16×16, and 8×8. The following table describes an appropriate sized overlay for display on icons of different sizes.

| Icon Size | Corresponding Overlay Size |
|---|---|
| 256 × 256 | 48 × 48 |
| 128 × 128 | 32 × 32 |
| 48 × 48 | 24 × 24 |
| 32 × 32 | 16 × 16 |
| 16 × 16 | 8 × 8 |

Thumbnail Stack Icons

Figure 8:
FIG. 8 illustrates a thumbnail stack icon from a photo or video library in accordance with an embodiment of the invention.
Figure 9:
FIG. 9 illustrates a music stack icon for songs grouped by album in a music library.

FIG. 8 illustrates a custom thumbnail icon 800 from the photo library. The thumbnail icon may be generated to represent items actually contained within the stack. FIG. 9 illustrates a custom thumbnail stack from the music library. In embodiments of the invention, custom thumbnail icons will be provided for stacks in the photo and video libraries. These thumbnail stacks should preview photographs from within the actual stack. Stacks of songs may be provided by album in the music library. Thus thumbnail stacks may show CD album art encased in a CD cover. The thumbnail icons may further include stacks of songs by artist in the music library. These thumbnails may display art relevant to the artist. If a custom thumbnail stack icon 26 is unavailable, the system displays the default stack icon from the stored default stack icons 22 for that stack.

In general, thumbnail icons may be treated just as other metadata on items. Thumbnail icons may be stored and extracted as bitmaps and may be referenced as a multi-valued property. Every item may have a flag that indicates one of three states regarding its thumbnails. In a first "yes" state, the flag indicates the existence of a cached thumbnail. In a second "no" state, there is no cached thumbnail one cannot be extracted. In a third "uncertain state" there is no cached thumbnail, and it is unclear whether a thumbnail can be extracted.

Icon Selection Method

Figure 3A:
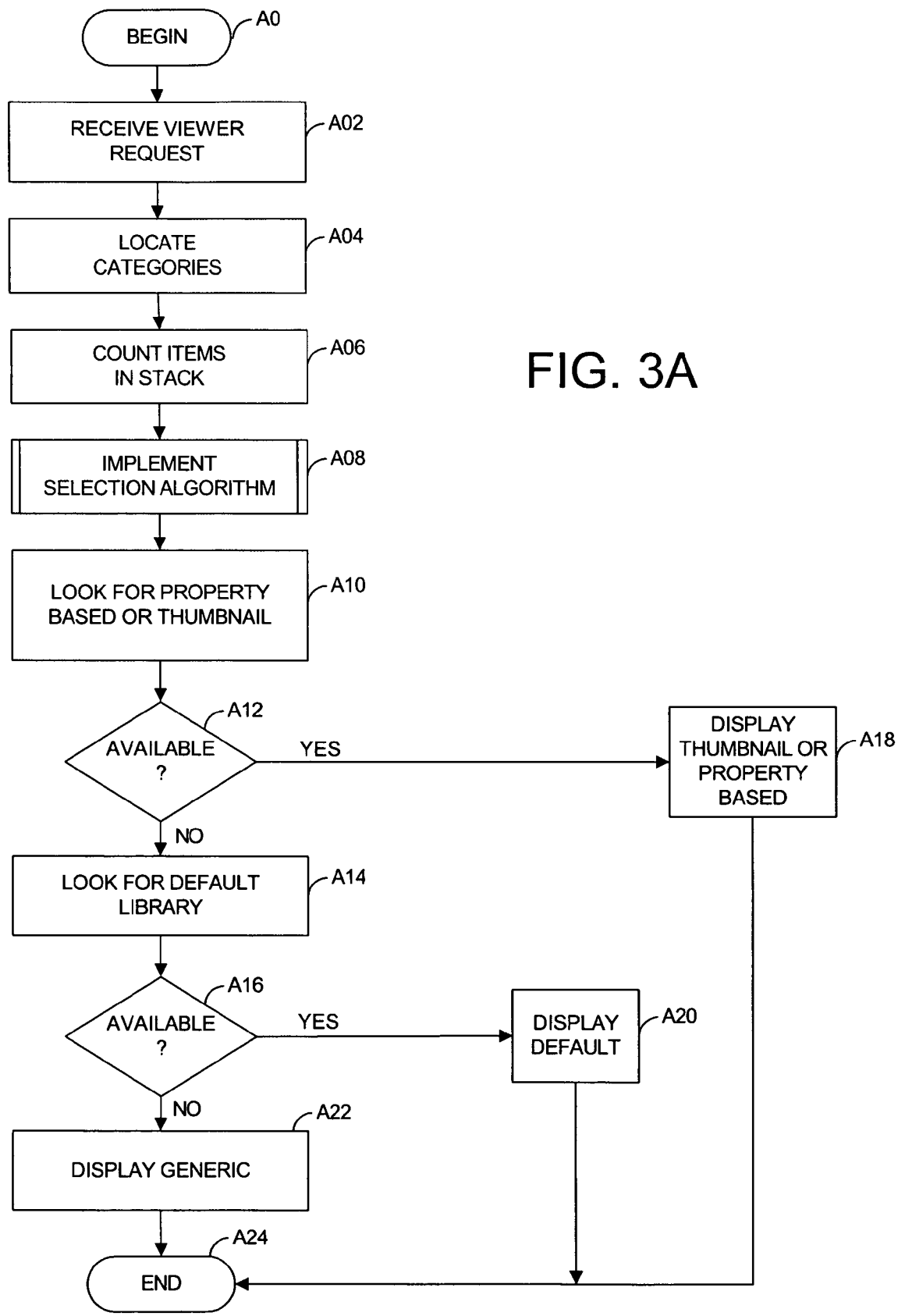
FIGS. 3A and 3B are flow charts illustrating a stack icon selection and display process in accordance with an embodiment of the invention.

FIG. 3A is a flow chart illustrating a method for selecting and displaying stack icons in accordance with an embodiment of the invention. The process begins in step A0 and the stack icon selection and display module 10 receives a user request in step A02. In step A04, the categorizing module 12 locates the category that corresponds to the user selection. In step A06, the counting tools 16 determine the number of items in the stack. In step A08, the icon selection tools 20 implement a selection algorithm to select an icon appropriate for the size of the stack. This process is further explained below with respect to FIG. 3B.

In step A10, the stack icon selection and display module 10 locates any special properties or available thumbnails. If either is available in step A12, the stack icon selection and display module 10 displays the thumbnail or property based icon in step A18. If neither a property-based or thumbnail icon is available in step A12, the system looks for a default library in step A14. If the default icon is found in step A16, the system displays the default icon in step A20. If the default icon is not found in step A16, the system retrieves and displays the generic icon in step A22 to complete the process in step A24.

Figure 3B:
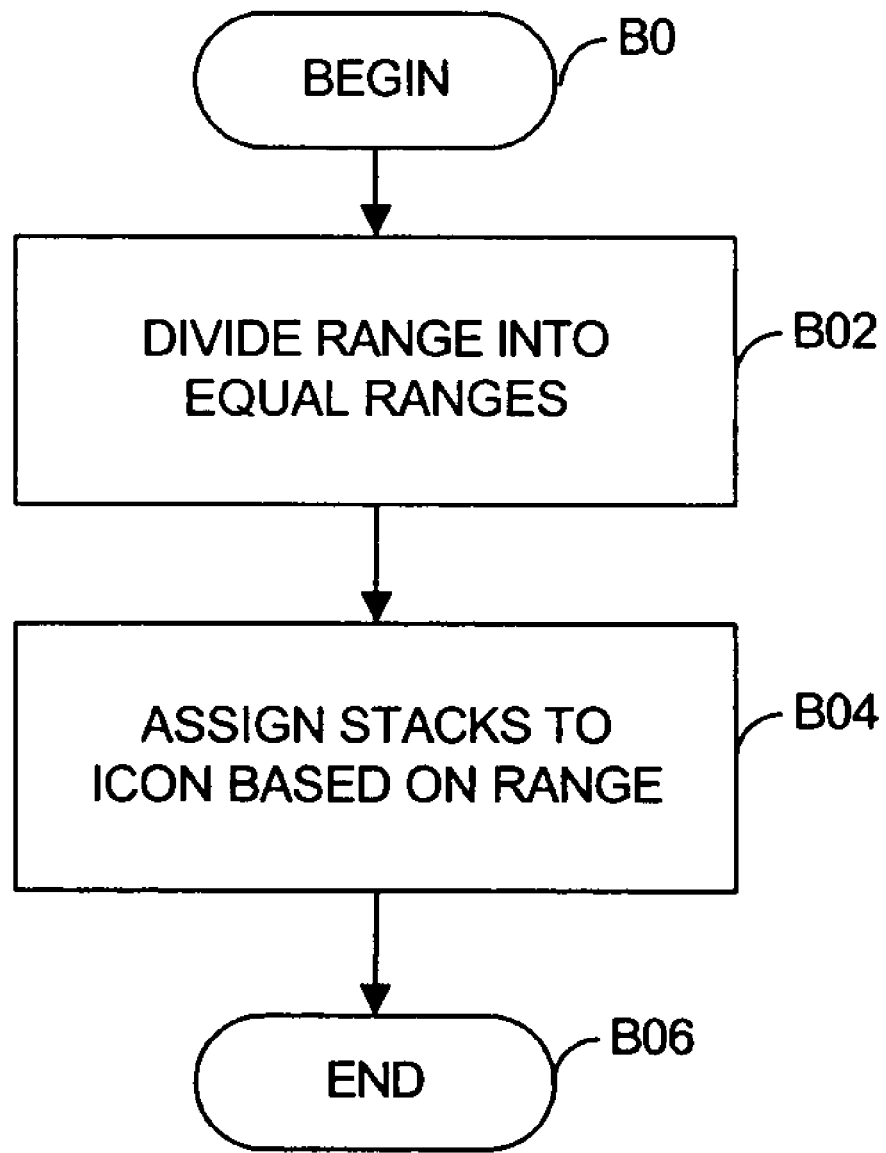

A limited number of stack icons is provided for representing all sizes of stacks. For instance, whereas a stack may have any number of items from zero to hundreds or thousands, five different stack icons may be provided to represent all of these different stack sizes. FIG. 3B is a flowchart illustrating a technique for selecting the appropriate stack icon for display. The process begins in step B0. In step B02, the system divides a range of stacks between the largest stack and the smallest stack having more than two items into three equal ranges. In step B04, the system assigns stacks to an icon based on the range. The stacks that fall in the largest range get the largest stack icon, the second largest get the next largest stack icon, etc. Stacks with one or two items get the stack of size "two" icon. Stacks with zero items get the stack of size zero icon. It may be desirable to use a larger or smaller number of stack icons to represent all sizes of stacks. In other embodiments of the invention, different selection algorithms may be used.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A computer-implemented method for representing files, the method comprising:
    using a processor to receive an identification of a plurality of groups of files, the groups of files to be represented by a plurality of stack icons, which are stored in a system memory that is connected to the processor by a system bus;
    counting a number of files in each group of files to determine how many files are in each group, wherein the plurality of groups of files includes groups having a range of numbers of files from a largest number of files to a smallest number of files;
    dividing the plurality of groups of files by size into three equal fractions of groups of files,
        (1) wherein each one of the three fractions includes a number of groups of files that is equal to one-third of the plurality of groups of files;
        (2) wherein a smallest third of the plurality of groups includes groups of files that have numbers of files falling in a smallest third of the range of numbers of files;
        (3) wherein a medium third of the plurality of groups includes groups of files that have numbers of files falling in a medium third of the range of numbers of files; and
        (4) wherein a largest third of the plurality of groups includes groups of files that have numbers of files falling in a largest third of the range of numbers of files;
    assigning a stack icon to each of the three equal fractions, the stack icon being selected from the plurality of stack icons,
        (1) wherein the plurality of stack icons comprise three predefined stack icons, which include a large-stack icon, a medium-stack icon, and a small-stack icon, and
        (2) wherein the large-stack icon is assigned to the largest third of the plurality of groups, the medium-stack icon is assigned to the medium third of the plurality of groups, and the small-stack icon is assigned to the smallest third of the plurality of groups; and
    retrieving each of the large-stack icon, the medium-stack icon, and the small-stack icon from the system memory and causing each of the large-stack icon, the medium-stack icon, and the small-stack icon to be displayed on a display device as visual representations of the plurality of groups of files.

2. The method of claim 1, further comprising storing an empty stack icon that displays an image distinct from other icons in the plurality of predefined stack icons.

3. The method of claim 2, further comprising selecting the empty stack icon when displaying a stack if the determined stack size is zero.

4. The method of claim 1, further comprising generating different stack icons to represent files in different distinct libraries, wherein each of said different stack icons displays information representative of the content of the files in the distinct library.

5. The method of claim 1, wherein each stack icon visually identifies a file type of the plurality of files.

6. The method of claim 5, wherein the visual identification of file type is a persistent overlay on the icon.

7. The method of claim 1, wherein one or more of the stack icons includes a thumbnail image displaying contents of one of the plurality of files.

8. A computer storage medium storing computer executable instructions for performing the method of claim 1.

9. The method of claim 6, wherein said overlay is a symbol provided by an application that owns the file type.

10. A computer storage medium having computer-executable instructions embodied thereon that, when executed, cause a computing device to perform a method for representing a plurality of files, the method comprising:
    using a processor to receive an identification of a plurality of groups of files, the groups of files to be represented by a plurality of stack icons, which are stored in a system memory that is connected to the processor by a system bus;
    counting a number of files in each group of files to determine how many files are in each group, wherein the plurality of groups of files includes groups having a range of numbers of files from a largest number of files to a smallest number of files;
    dividing the plurality of groups of files by size into three equal fractions of groups of files,
        (1) wherein each one of the three fractions includes a number of groups of files that is equal to one-third of the plurality of groups of files;
        (2) wherein a smallest third of the plurality of groups includes groups of files that have numbers of files falling in a smallest third of the range of numbers of files;
        (3) wherein a medium third of the plurality of groups includes groups of files that have numbers of files falling in a medium third of the range of numbers of files; and (4) wherein a largest third of the plurality of groups includes groups of files that have numbers of files falling in a largest third of the range of numbers of files;

assigning a stack icon to each of the three equal fractions, the stack icon being selected from the plurality of stack icons, (1) wherein the plurality of stack icons comprise three predefined stack icons, which include a large-stack icon, a medium-stack icon, and a small-stack icon, and (2) wherein the large-stack icon is assigned to the largest third of the plurality of groups, the medium-stack icon is assigned to the medium third of the plurality of groups, and the small-stack icon is assigned to the smallest third of the plurality of groups; and retrieving each of the large-stack icon, the medium-stack icon, and the small-stack icon from the system memory and causing each of the large-stack icon, the medium-stack icon, and the small-stack icon to be displayed as visual representations of the plurality of groups of files.

11. The computer storage medium of claim 10, wherein the method further comprises generating a unique empty stack icon representing a stack having no files.

12. The computer storage medium of claim 11, further comprising selecting the empty stack icon in response to a user request to display a stack having no files.

13. The computer storage medium of claim 10, further comprising the step of adding an overlay to each stack icon, said overlay identifying a property of the files represented by the generated icon.

14. The computer storage medium of claim 10, wherein said step of retrieving further includes the step of including a thumbnail in one or more of the stack icons said thumbnail depicting contents of one of said plurality of files.

15. The method of claim 13, wherein said property in said overlay identifies an application that owns the file type.

16. The method of claim 10, wherein said one or more medium stack icons comprise a second largest stack icon and wherein said second smallest stack icon comprises a third largest stack icon.

17. A system for representing a selected stack of files, the system comprising:

a processor that is usable to receive an identification of a plurality of groups of files, the groups of files to be represented by a plurality of default stack icons, which are stored in a system memory that is connected to the processor by a system bus;

a computer storage medium having computer-executable instructions embodied thereon that, when executed, cause a computing device to:

(1) count a number of files in each group of files to determine how many files are in each group, wherein the plurality of groups of files includes a range of numbers of files from a largest number of files to a smallest number of files;

(2) divide the plurality of groups of files by size into three equal fractions of groups of files, a) wherein each one of the three fractions includes a number of groups of files that is equal to one-third of the plurality of groups of files;

b) wherein a smallest third of the plurality of groups includes groups of files that have numbers of files falling in a smallest third of the range of numbers of files;

c) wherein a medium third of the plurality of groups includes groups of files that have numbers of files falling in a medium third of the range of numbers of files; and d) wherein a largest third of the plurality of groups includes groups of files that have numbers of files falling in a largest third of the range of numbers of files;

(3) assign a stack icon to each of the three equal fractions, the stack icon being selected from the plurality of stack icons, a) wherein the plurality of stack icons comprise three predefined stack icons, which include a large-stack icon, a medium-stack icon, and a small-stack icon, and b) wherein the large-stack icon is assigned to the largest third of the plurality of groups, the medium-stack icon is assigned to the medium third of the plurality of groups, and the small-stack icon is assigned to the smallest third of the plurality of groups; and (4) retrieve each of the large-stack icon, the medium-stack icon, and the small-stack icon from the system memory and cause each of the large-stack icon, the medium-stack icon, and the small-stack icon to be displayed as visual representations of the plurality of groups of files.

18. The system of claim 17, said plurality of stack icons further comprising a unique empty stack icon that displays a distinct image.

19. The system of claim 17, said computer storage medium further storing a set of property based icons for at least one library, wherein the property based icons include an overlay indicating a common property of files represented by an underlying stack icon.

20. The system of claim 17, said computer-executable instructions further comprising instructions for generating a set of custom thumbnail icons for at least one selected library, wherein the custom thumbnail icons include at least one image from a stack within the at least one selected library.

21. The system of claim 17, said computer executable instructions further comprising instructions for counting the number of files in a selected stack and displaying the number adjacent to or on the icon.

22. The method of claim 15, wherein said overlay is provided by the application that owns the file type.

* * * * *

UNITED STATES PATENT AND TRADEMARK OFFICE
CERTIFICATE OF CORRECTION

| | | |
|---|---|---|
| PATENT NO. | : 7,657,846 B2 | Page 1 of 1 |
| APPLICATION NO. | : 10/830224 | |
| DATED | : February 2, 2010 | |
| INVENTOR(S) | : Banks et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1153 days.

Signed and Sealed this

Thirtieth Day of November, 2010

David J. Kappos
*Director of the United States Patent and Trademark Office*